United States Patent
Bauer et al.

(10) Patent No.: US 12,012,666 B2
(45) Date of Patent: Jun. 18, 2024

(54) NANODIAMOND ARTICLE AND ASSOCIATED METHODS OF FABRICATION

(71) Applicant: EAGLE TECHNOLOGY, LLC, Melbourne, FL (US)

(72) Inventors: Matthew J. Bauer, Melbourne, FL (US); Jamel Burruss, Melbourne, FL (US); Louis J. Rendek, Jr., Melbourne, FL (US); Mu-Jen Yang, Palm Bay, FL (US); Jason Thompson, Melbourne, FL (US); Robert J. Mulligan, Rockledge, FL (US); Robert Wortman, Indialantic, FL (US)

(73) Assignee: EAGLE TECHNOLOGY, LLC, Melbourne, FL (US)

( * ) Notice: Subject to any disclaimer, the term of this patent is extended or adjusted under 35 U.S.C. 154(b) by 494 days.

(21) Appl. No.: 17/151,264

(22) Filed: Jan. 18, 2021

(65) Prior Publication Data

US 2022/0228283 A1     Jul. 21, 2022

(51) Int. Cl.
| | |
|---|---|
| C25D 13/02 | (2006.01) |
| C01B 32/15 | (2017.01) |
| C01B 32/25 | (2017.01) |
| C25D 13/20 | (2006.01) |

(52) U.S. Cl.
CPC .............. *C25D 13/02* (2013.01); *C01B 32/15* (2017.08); *C01B 32/25* (2017.08); *C25D 13/20* (2013.01)

(58) Field of Classification Search
None
See application file for complete search history.

(56) References Cited

U.S. PATENT DOCUMENTS

| | | |
|---|---|---|
| 5,128,006 A | 7/1992 | Mitchell et al. |
| 6,174,561 B1 | 1/2001 | Taylor |
| 6,258,237 B1 | 7/2001 | Gal-Or et al. |
| 6,555,170 B2 | 4/2003 | Taylor |
| 6,577,045 B1 | 6/2003 | Blyablin et al. |
| 7,201,972 B2 | 4/2007 | Shiozaki et al. |
| 8,007,910 B2 | 8/2011 | Zhang et al. |

(Continued)

FOREIGN PATENT DOCUMENTS

| | | |
|---|---|---|
| CN | 102605208 | 7/2012 |
| CN | 103187131 | 7/2013 |

(Continued)

OTHER PUBLICATIONS

"Chemical purification and characterization of diamond nanoparticles for electrophoretically coated electrodes." Reviews on Advanced Materials Science 10(3): 256-260. (Year: 2005).*

(Continued)

*Primary Examiner* — Jeffrey D Washville
(74) *Attorney, Agent, or Firm* — ALLEN, DYER, DOPPELT, + GILCHRIST, P.A.

(57) ABSTRACT

A method for making a nanodiamond article includes applying an adhesion promoting layer to a substrate, and electrophoretically depositing a nanodiamond film on the substrate with the adhesion promoting layer thereon in a solution to make the nanodiamond article. The nanodiamond article may include a substrate, a nanodiamond film over the substrate, and the adhesion promoting layer between the substrate and the nanodiamond film.

6 Claims, 14 Drawing Sheets

(56) References Cited

U.S. PATENT DOCUMENTS

| | | | |
|---|---|---|---|
| 9,085,723 | B2 | 7/2015 | Myllymaki et al. |
| 9,598,558 | B2 | 3/2017 | Myllymaki |
| 10,941,500 | B1* | 3/2021 | Myrick .................. C25D 5/10 |
| 2006/0113546 | A1 | 6/2006 | Sung |
| 2007/0126312 | A1 | 6/2007 | Sung |
| 2011/0256347 | A1 | 10/2011 | Manuad et al. |
| 2012/0148762 | A1 | 6/2012 | Wei et al. |
| 2013/0205678 | A1 | 8/2013 | Montross |
| 2014/0335274 | A1 | 11/2014 | Vandenryt et al. |
| 2019/0100434 | A1* | 4/2019 | Moriguchi .............. C01B 32/05 |

FOREIGN PATENT DOCUMENTS

| | | |
|---|---|---|
| DE | 102019127658 | 4/2021 |
| GB | 2482780 | 2/2012 |

OTHER PUBLICATIONS

Amit Rai, "Characterization of Nanomaterials for Thermal Management of Electronics," Louisiana Tech University, Louisiana Tech Digital Commons, Doctoral Dissertation, Nov. 17, 2018, pp. 1-147.

Thomas Guillemet, "Diamond-Based Heat Spreaders for Power Electronic Packaging Applications," Université Sciences et Technologies—Bordeaux I, Material Chemistry, Doctoral Dissertation, Aug. 2013, pp. 1-286.

A. M. Affoune et al., "Electrophoretic Deposition of Nanosized Diamond Particles," Department of Chemistry, Tokyo Institute of Technology, Langmuir, vol. 17, No. 2, 2001, pp. 547-551.

Olga Shenderova et al., "Nanodiamonds Shine New Light on Bio Applications," Features, BioPhotonics, Jun. 2015, pp. 1-8.

Grandview Research, "Thermal Management Technologies Market Analysis by Product (Hardware, Software, Interface, Substrates), by Application (Computers, Consumer Electronics, Telecommunication, Automotive Electronics, Renewable Energy) and Segment Forecasts to 2024," Summary Report, Aug. 2016, pp. 1-4.

Grandview Research, "Thermal Management Market with COVID-19 impact Analysis by Material, Device (Conduction, Convection, Advanced, and Hybrid), Service (Installation & Calibration and Optimization & Post-sales Support), End-Use Industry, and Region—Global Forecast to 2025," Summary Report, Report Code: SE 5290, Jul. 2020, pp. 1-9.

Bauer et al., U.S. Appl. No. 17/151,275, filed Jan. 18, 2021.

* cited by examiner

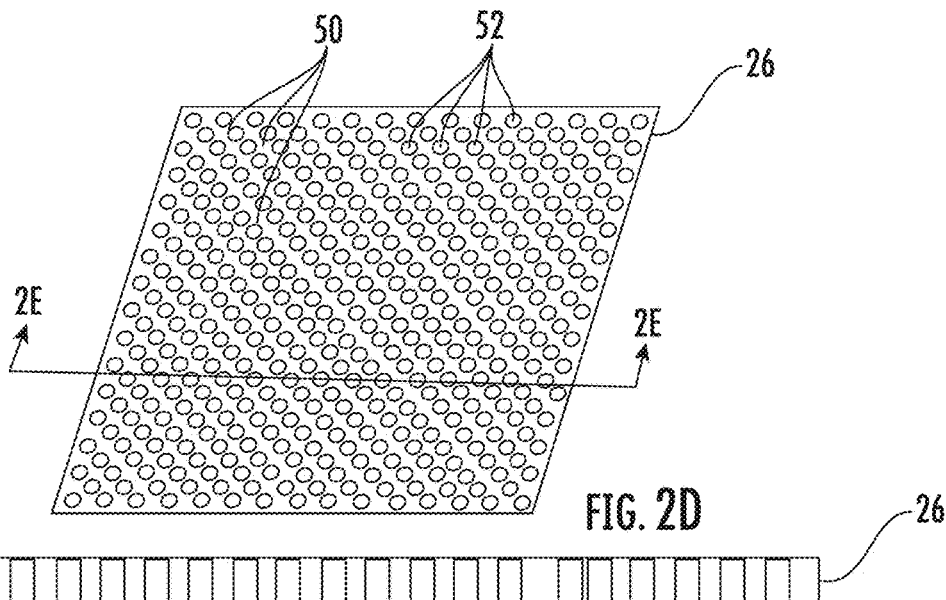
FIG. 2D
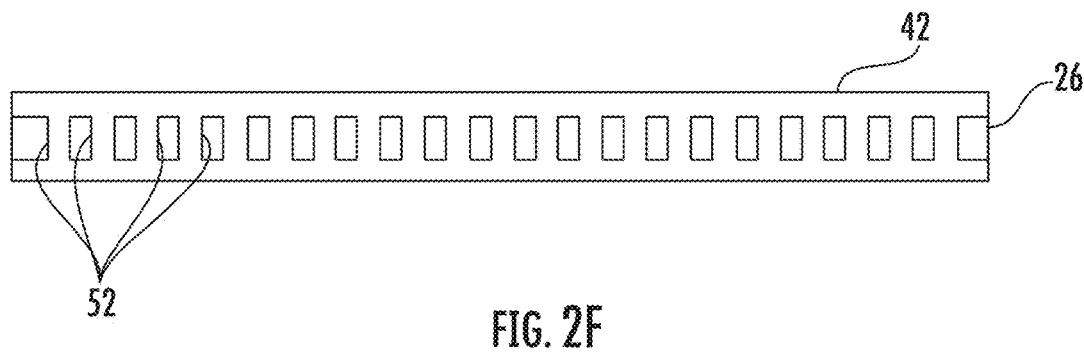
FIG. 2E
FIG. 2F

NANODIAMOND THICK FILM PRE AND POST ANNEAL AT 700°C

| ELEMENT | WT. % PRE | WT. % POST | DELTA | DELTA (%) |
|---|---|---|---|---|
| C | 76.64 | 81.1 | 4.46 | 1.413719 |
| O | 7.52 | 4.34 | -3.18 | -13.4064 |
| Ti | 0.2 | 0.24 | 0.04 | 4.545455 |
| Cu | 15.12 | 13.86 | -1.26 | -2.17391 |
| I | 0.51 | 0.45 | -0.06 | -3.125 |

FIG. 13

NANODIAMOND ARTICLE AND ASSOCIATED METHODS OF FABRICATION

FIELD OF THE INVENTION

The present invention relates to the field of nanodiamonds, and, more particularly, to the electrophoretic deposition of nanodiamond coatings (or films).

BACKGROUND OF THE INVENTION

The decreasing size and weight of modern electronic devices, coupled with the increasing performance demands, results in the packing of higher heat density producing electronics into a smaller space. Diffusion or extraction of this thermal energy may be a limiting factor in miniaturizing these heat producing electronics. Numerous novel approaches to thermal management at both the component and system level have been implemented in different electronic devices. For example, printed circuit boards may include copper thermal vias or thick, embedded metal layers or composites. These approaches, however, are often heavy and may result in marginal thermal performance enhancements compared to the baseline entity.

Other thermal management techniques may include use of thick metallic spreaders, but those approaches likewise tend to be expensive, heavy, and sometimes have a long development lead time. Graphite composites may be used, but the matrix phase reduces the effective thermal conductivity far below that of metals. Heat pipes are efficient in carrying heat away from electronic devices but may have geometry limitations. Additionally, some die carriers may incorporate copper alloys but are generally inadequate for high power applications consistent with low-SWAP (Size, Weight and Power) trends. Diamonds or diamond-like materials are considered to have excellent thermal conductivity, but generally have geometry limitations and are relatively expensive.

A traditional diamond is difficult to machine and usually may not be placed where the diamond is desired for heat dissipation. The costs associated with using traditional diamond are also exceptionally high given their rarity in the world and limited distribution. There have been some diamond-like films that may be deposited via chemical vapor deposition, but this diamond deposition process is slow and unsuitable for thick, thermally conductive films. Moreover, the actual crystallographic structures in those diamond films deposited by chemical vapor deposition are often more similar to an amorphous carbon substrate than actual diamond, and consequently, may not have adequate heat dissipation characteristics.

Detonation nanodiamonds were first discovered in 1963 when it was incidentally observed that the detonation of carbon-based explosives leads to the formation of nanodiamonds along with metal, amorphous carbon, and graphene/graphite. Detonation nanodiamonds, which share many of the stellar properties as traditional diamond, exhibit the highest thermal conductivity of all known materials, have a significantly lower density than other thermal conductors, and possesses good dielectric properties including low dielectric loss, low-k, and a high breakdown strength. Mechanically, nanodiamond also has a low coefficient of thermal expansion (CTE) and high hardness. This hardness makes nanodiamonds useful when added to alloys. Their nanoparticle size distinguishes them from microscale diamond particles, which act as an abrasive, while nanodiamonds generally act as small ball bearings in solution, making them useful in lubricants. Nanodiamonds have even been considered for drug delivery applications due to their biocompatibility.

Nanodiamonds have also been included in thermal pastes to improve thermal contact between heat spreaders and heat sinks or similar components. However, due to a general lack of control in placement of the nanodiamonds, they usually have been formed into 0-3 composites, where the nanodiamonds (small and "0" dimensional) are inserted into another material resulting in a three-dimensional matrix. In that matrix configuration, the thermal conductivity and electrical insulation provided by the nanodiamonds are diminished by the more abundant matrix material. Additionally, the properties of this type of composite are isotropic, i.e., the composite cannot be used to preferentially direct heat or electrical flow. The enhanced and anisotropic properties that would be provided by a nanodiamond coating as a 2-2 composite have not yet been obtained using nanodiamonds.

Both thin and thick deposits of wider known, and more thoroughly studied micro and nanoparticles have been formed via electrophoretic deposition. This deposition technique typically requires a solution having the following components to form a successful deposit: the micro-, or nano-, particle of interest, an additive used to modify the surface charge of the particle of interest, and a solvent in which both aforementioned components can be dispersed or dissolved. Upon thorough solution mixing, additive ions of the opposite charge build up around each particle of interest, creating an electrical double layer, which helps disperse the particles. When subjected to an electric field applied between the counter and deposition electrodes, the resultant surface charge on the particles causes them to be attracted to the deposition electrode and, if sufficient adhesion forces are present at the deposition electrode, form a coating. Often the particles may not adequately adsorbed onto the substrate surface without proper chemical and physical modification to the substrate, similar to how surfaces are modified for sputtering or electroplating adhesion.

There have been some attempts to plate an article or substrate with nanodiamonds using an electroplating process, but those processes have formed a 0-3 composite, where the nanodiamonds are part of the matrix. An example is disclosed in U.S. Pat. No. 7,201,972, which describes a method for forming a heat sink plate that includes nanodiamond particles dispersed within the plate itself as part of a matrix. The nanodiamond particles are disbursed homogenously in the direction of the film thickness in the metal plate, and have a concentration of about 1% to 12% of the metal plate. Although the limited percentage of nanodiamond particles in the plate provide some advantage in heat transfer, further improvements are desired to form a nanodiamond film on a substrate capable of providing enhanced thermal properties necessary for effective heat transport. Increased concentration of nanodiamonds forming a 2-2 composite could significantly improve the thermal transfer from the film. Moreover, a 2-2 composite would be able to be placed where needed for thermal transfer and electrical isolation.

SUMMARY OF THE INVENTION

In general, a method for making a nanodiamond article may comprise applying an adhesion promoting layer to a substrate, and electrophoretically depositing a nanodiamond film on the substrate with the adhesion promoting layer thereon in a solution to make the nanodiamond article.

The adhesion promoting layer may comprise a film-forming amine. The method may comprise forming a positive surface charge on the nanodiamonds, for example, by adsorbing protons generated in the solution. The protons may be generated by a ketone and iodine reaction. The ketones may comprise acetone.

The method may comprise annealing the nanodiamond article after electrophoretically depositing the nanodiamond film. The annealing may occur at a temperature of greater than 200 degrees C. The nanodiamond film may be deposited to a thickness of greater than 30 microns. The nanodiamond film may have a thickness greater than 50 nm and less than 30 microns. Another layer may be deposited on the nanodiamond article after electrophoretically depositing the nanodiamond film. The substrate may comprise an electrical conductor.

In another aspect, a nanodiamond article may comprise a substrate, a nanodiamond film over the substrate, and an adhesion promoting layer between the substrate and the nanodiamond film. The substrate may comprise an electrical conductor. The electrical conductor may comprise copper. The nanodiamond film may have a thickness of greater than 30 microns. The nanodiamond film may define a 2-2 composite film.

BRIEF DESCRIPTION OF THE DRAWINGS

Other objects, features and advantages of the present invention will become apparent from the detailed description of the invention which follows, when considered in light of the accompanying drawings in which:

FIG. 2D is a top plan view of a perforated substrate before the nanodiamond film has been electrophoretically deposited.

FIG. 2E is a sectional view of the perforated substrate of FIG. 2D taken along line 2E-2E of FIG. 2D before the nanodiamond film has been electrophoretically deposited.

FIG. 2F is a sectional view of the perforated substrate similar to that shown in FIG. 2E after the nanodiamond film has been electrophoretically deposited.

FIG. 13 is a chart showing the weight reduction of the nanodiamond film for pre- and post-anneal at 700° C.

DETAILED DESCRIPTION

The present description is made with reference to the accompanying drawings, in which exemplary embodiments are shown. However, many different embodiments may be used, and thus, the description should not be construed as limited to the particular embodiments set forth herein. Rather, these embodiments are provided so that this disclosure will be thorough and complete. Like numbers refer to like elements throughout.

Figure 1:
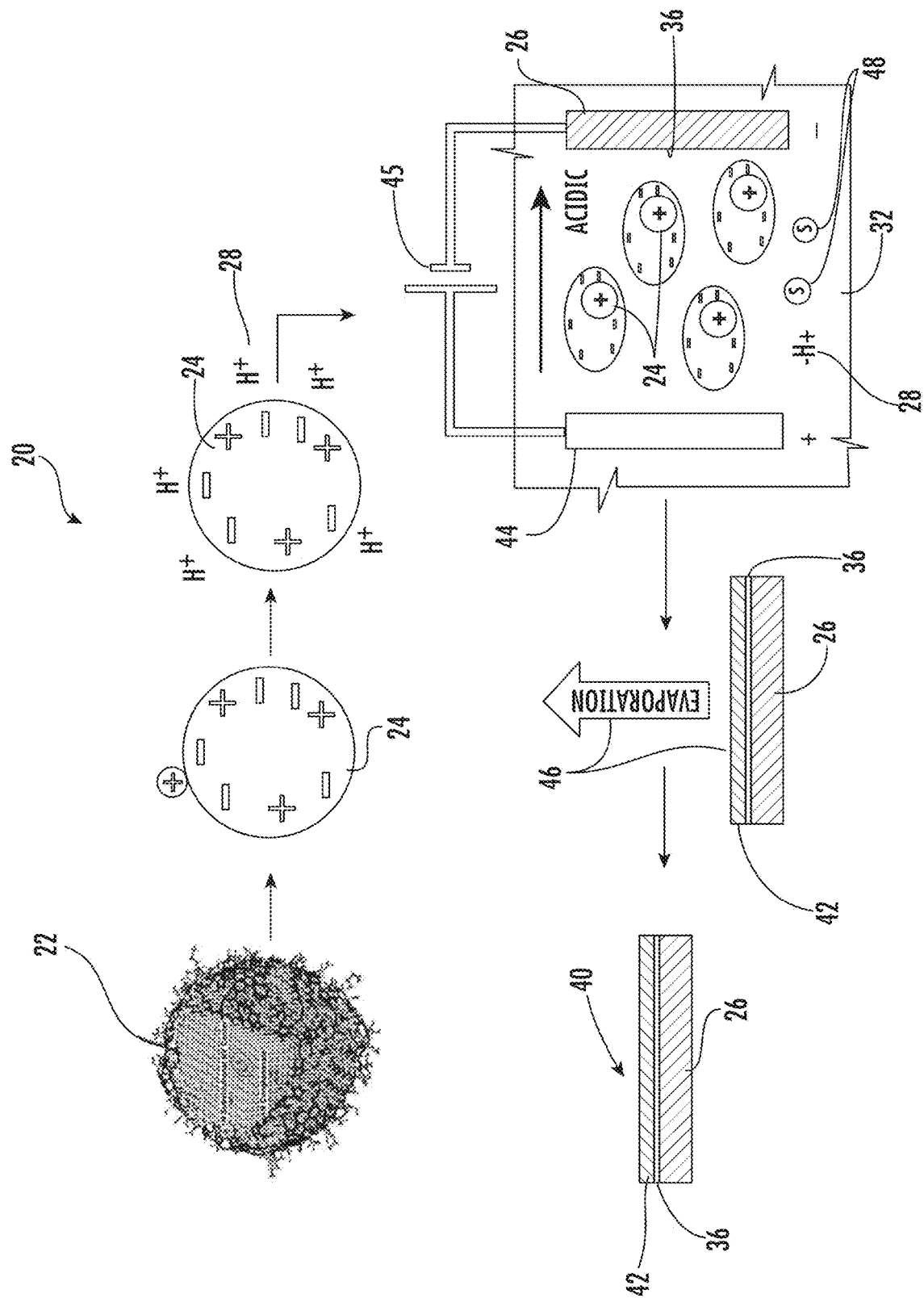
FIG. 1 is a schematic flow diagram showing the sequence of steps for electrophoretically depositing a nanodiamond film on a substrate and making a nanodiamond article in accordance with a non-limiting example.

Referring initially to FIG. 1, a method for fabricating a nanodiamond article in this non-limiting example is shown by the flow sequence indicated at 20 and begins with a carbon conglomerate in an explosive mixture with a low oxygen balance such as TNT/RDX 22 that is subject to explosive energy to form the detonation nanodiamond 24, which has an inherently negative zeta potential due to the carboxyl negative charges on the outside of the detonation nanodiamond. In order to successfully electrophoretically deposit a nanodiamond film on a substrate 26 in a solution, the zeta potential of the nanodiamond particle 24 is switched from negative to positive. This polarity switching is accomplished by forming a positive surface charge 28 on the nanodiamond 24, and in an example, by using the iodine assisted reaction:

to generate protons which are subsequently adsorbed on the nanodiamond surface. Similarly, other suitable molecules and reagents may produce protons for this polarity switching of the nanodiamond surface such as acetylacetone and iodine, or other ketones and similar iodine reactions. The deposition solution may be altered using additional solvents to modify the evaporation rate during subsequent drying, or additional solvents to modify the permittivity of the deposition solution, or solvents to modify the surface tension of the solution.

The nanodiamond coating 42 is electrophoretically deposited on the substrate 26, which operates as the negative electrode in the solution 32, which includes the positive electrode 44 and the nanodiamonds 24 to make the final nanodiamond article 40. The substrate 26 may be formed as an electrical conductor, such as copper, and the electromotive force provided by a power source 45 connected to the electrodes 26, 44. The substrate 26, may also be formed as a semiconductor, composite, or even in certain cases an insulator around which an electric field gradient can be applied.

Substrate surface modification to promote nanodiamond adhesion is desirable, and in the case of copper, film-forming amines offer a convenient route to adhesion promotion. Copper surfaces that are modified with film-forming amine 36 may be fabricated as a separate step prior to nanodiamond deposition. The film-forming amine may be such as described in U.S. Pat. No. 6,555,170, the disclosure which is hereby incorporated by reference in its entirety. Many different film-forming amines may be used, including cationic, amphoteric, or nonionic amines. Fatty acid amines may be used that include long chain R groups, such as long chain aliphatic alkyl groups having a terminal carboxylic acid function. An organic monobasic cyclic tertiary amine may be used, such as 1-hydroxyethyl-2 alkylimidazolimes with an alkyl group having 7 to 17 carbon atoms.

The film-forming amine 36 is hydrophobic and the solution 32 may include an acid to lower the pH to below 7, such as around 6.5. The acid in solution 32 may function as a cleaner, oxidation inhibitor, adhesion promoter, flexibility enhancer, redeposition inhibitor and etch enhancer. A surfactant 48 may be included within the solution 32 to increase cleaning activity, assist chromate removal, function as a wetting agent, and reduce foaming of the solution. In an example, the surfactant lowers the surface tension of the solution such as to less than 70 dynes/cm$^2$, and in some cases, to less than 30 dynes/cm$^2$. Example surfactants include different non-ionic surfactants such as Antarox® manufactured by Solvay of Brussels, Belgium.

The solution 32 that carries the nanodiamonds 24, may include an organic solution formed from a variety of solvents, such as NMP (N-methyl-2 pyrrolidone) and isopropyl alcohol but should contain an organic solvent from the ketone family, such as acetone, to react with iodine (or some other reagent) to produce protons capable of providing positive surface charge to the nanodiamond particle. As shown in FIG. 1, the film-forming amine 36 may be formed on the substrate 26 as a film-forming amine layer and allows enhanced coating and formation of the nanodiamond coating 42 during the electrophoretic deposition process. In an example, the nanodiamond coating 42 has a thickness greater than 30 microns and defines a 2-2 composite film. In another example, the nanodiamond coating 42 has a thickness in the range of 50 nanometers to 50 microns. In yet another example, the nanodiamond coating 42 has a thickness greater than 50 nm and less than 30 microns. When the substrate 26 having the film-forming amine layer 36 and electrophoretically deposited nanodiamond coating 42 is removed from the solution 32, the organic solvent formed from the isopropyl alcohol, N-methyl-2 pyrrolidone, and acetone and contained on the surface of the nanodiamond coating 42 evaporates 46, and afterward, the formed nanodiamond article 40 may be annealed, such as at a temperature greater than 150° C. as explained in greater detail below.

In an example, the film nanodiamond coating 42 is a continuous film on the substrate 26 and may include greater than 50% nanodiamond concentration by volume, in another example, greater than 75% nanodiamond concentration by volume, and in yet another example, greater than 95% nanodiamond concentration by volume. The continuous film as the nanodiamond coating 42 may include a binder, such as an epoxy or similar binder. The continuous film 42 may have voids therein.

Figure 2A:
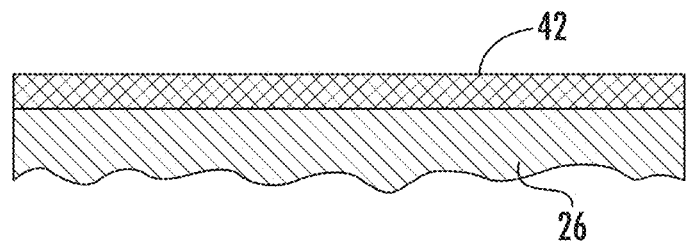
FIG. 2A is a sectional view of a planar substrate surface showing the nanodiamond film electrophoretically deposited onto the substrate surface.
Figure 2B:
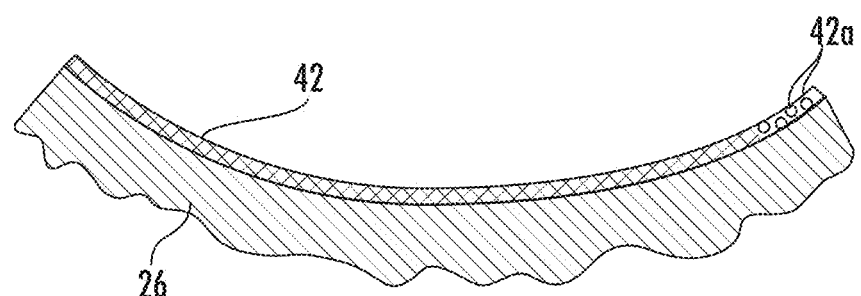
FIG. 2B is a sectional view of a concave substrate surface showing the nanodiamond film electrophoretically deposited onto the substrate surface.
Figure 2C:
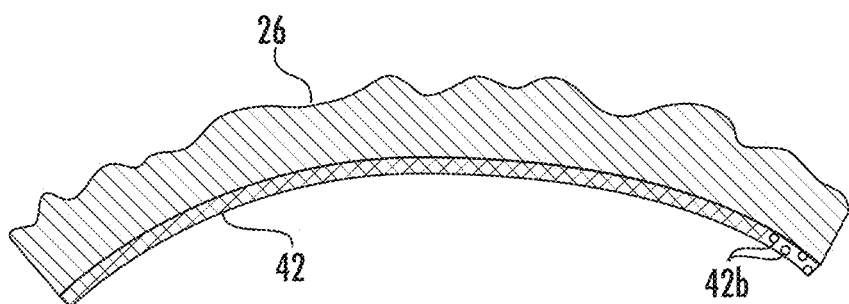
FIG. 2C is a sectional view of a convex substrate surface showing the nanodiamond film electrophoretically deposited onto the substrate surface.

Referring now to FIGS. 2A-2F, there are illustrated sectional and plan views of the example substrates 26 showing the substrate electrophoretically deposited with the nanodiamond coating 42. The substrate 26 may be formed from metal, doped semiconductor, composite, or even insulating materials so long as an electric field gradient may be applied at the surface. The material surface may be planar (FIG. 2A), concave (FIG. 2B), convex (FIG. 2C), or perforated (FIGS. 2D-2F). Multiple surfaces may be simultaneously coated to form a mesh structure. In an example, a perforated dielectric article may have an upper metal conducting skeleton 50 with or without numerous holes machined through the dielectric layer 52 as shown in FIGS. 2D-2F, showing in FIG. 2F the nanodiamond film 42 electrophoretically deposited, including within the holes. In the example of FIG. 2B, the coating 42 includes voids 42a, and in the example of FIG. 2C, the coating includes a binder 42b.

Referring again to FIG. 1, in an example, the nanodiamond coating 42 may be electrophoretically deposited at fabrication speeds up to 1 micron per minute, and depending on the type of solution, at up to 1 to 3 microns per minute with deposition thicknesses in the range of 50 nm to 50 microns, preferentially greater than 30 microns, and in another example, up to a 30 to 50 micron thickness. In an example, about 90 volts is applied by the power source 45 with a 2½ centimeter electrode gap, 26 and the type of solution 32. It is possible, and in some situations beneficial, to apply higher voltages such as 400 volts, again depending on the material used as a substrate 26, type of solution 32 and required rate of deposition. In other cases this may result in substrate damage, poor coating morphology, or other issues, and lower voltage/field may be required.

Figure 3:
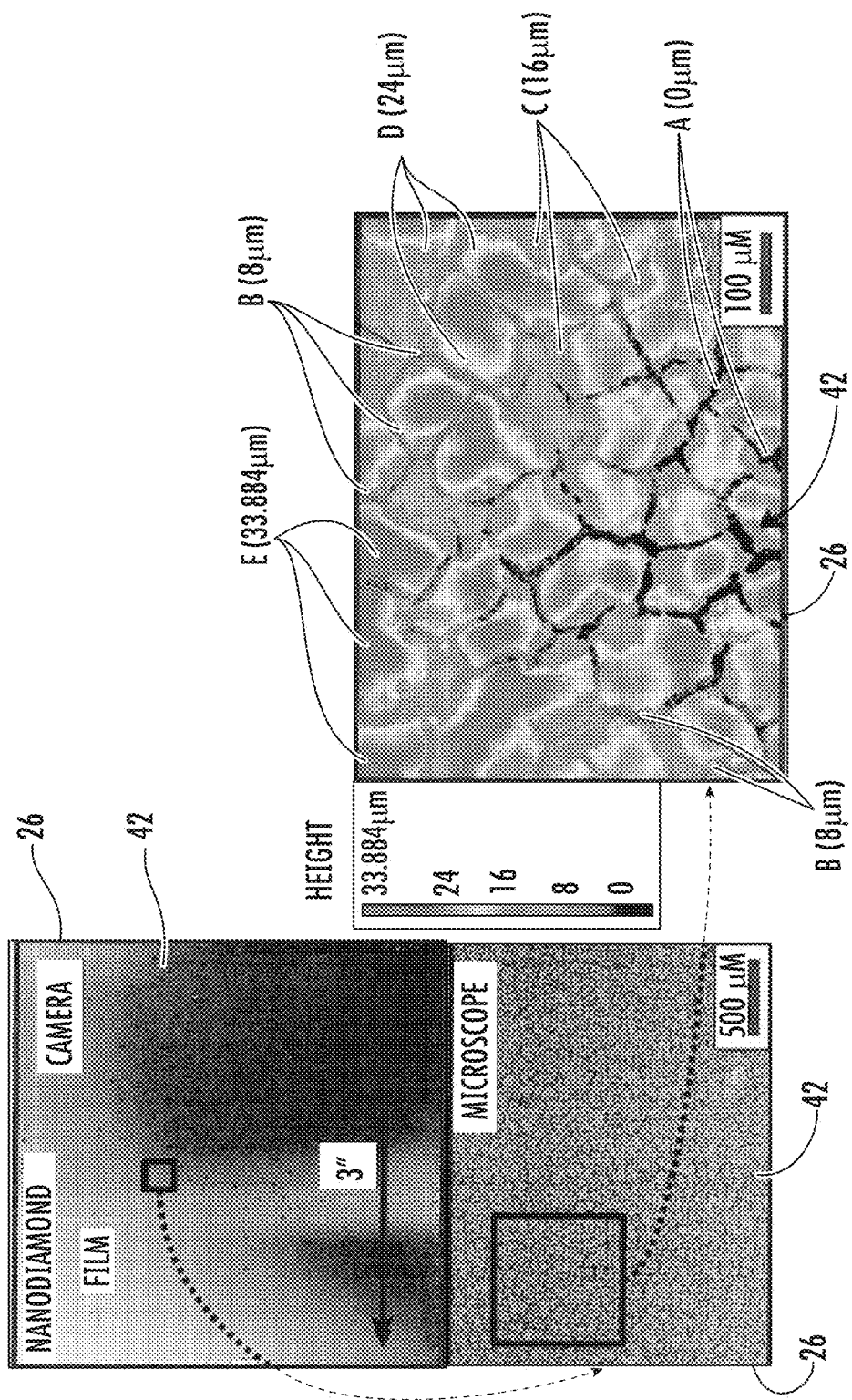
FIG. 3 is a composite image of successively enlarged images of the electrophoretically deposited nanodiamond film showing an enlarged camera view, a microscopic view, and enhanced microscopic view.

Referring now to FIG. 3, there is illustrated at the upper left an enlarged camera view of the nanodiamond coating 42 on a substrate 26 and showing a width across the nanodiamond film of about 3 inches. An enlarged microscopic view of the nanodiamond coating 42 is illustrated at the lower left and having a legend for length, indicating about 500 micrometers for the example distance. A confocal microscopic view at the lower right shows the height, i.e., the depth of the nanodiamond coating 42 at up to 33.9 microns and indicates varying topology via colorscale.

Figure 4:
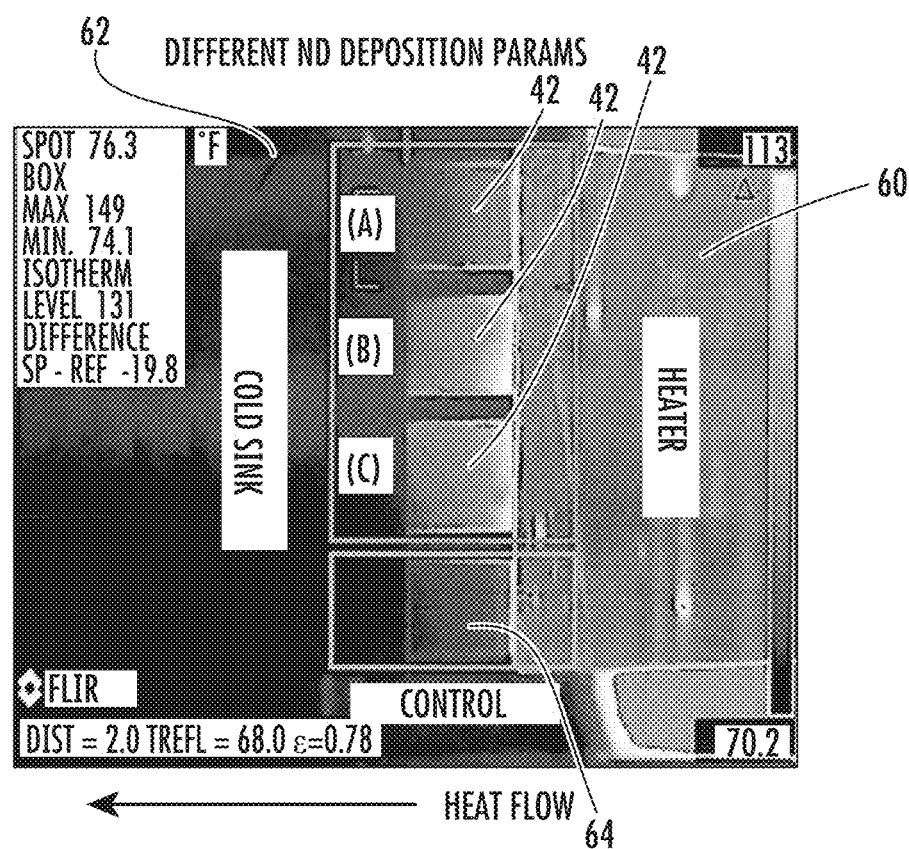
FIG. 4 is a FLIR (Forward-Looking Infrared) image showing heat flow through the nanodiamond film deposited between a heater substrate and cold sink.

Referring now to FIG. 4, there is illustrated a Forward-Looking Infrared (FLIR) image showing a nanodiamond film 42 that is connected between a heater substrate 60 and a cold sink 62 to demonstrate enhanced thermal conductivity and heat transfer. Three different nanodiamond coating 42 samples are labeled A, B and C, and show that the nanodiamond coatings demonstrated an increase in thermal transfer from the heater substrate 60 to the cold sink 62, as compared to a copper control illustrated at 64. This demonstration showed that the sufficiently dense nanodiamond coatings 42 exhibited significant improvement over copper films. Different thermal values are labeled on the image and show the optimized deposition density and conductivity parameters.

Figure 5:
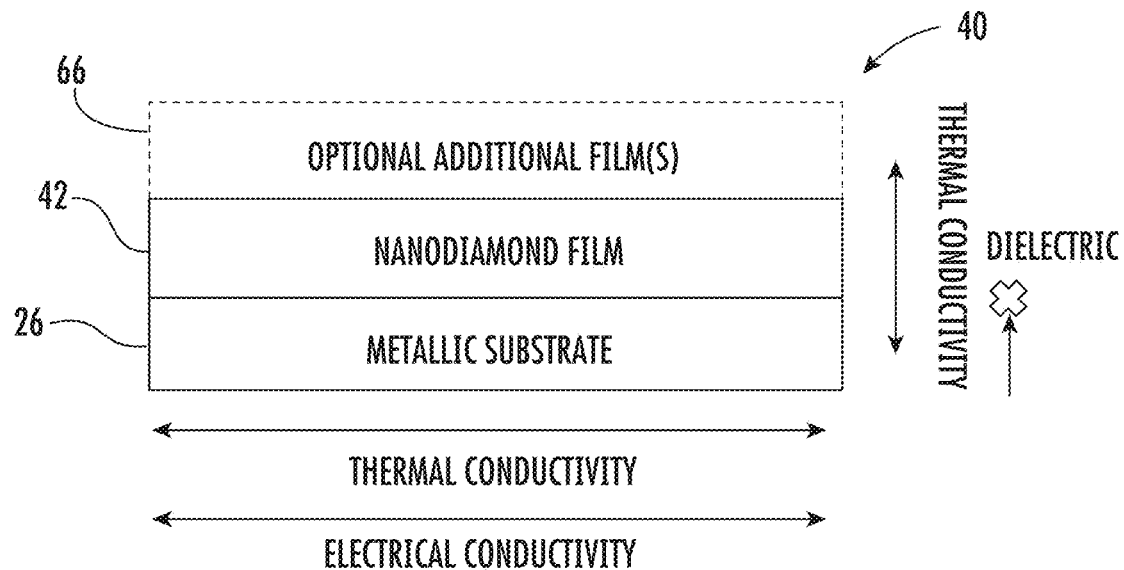
FIG. 5 is a schematic, sectional view of the nanodiamond article showing its thermal, electric and dielectric directional characteristics.
Figure 6:
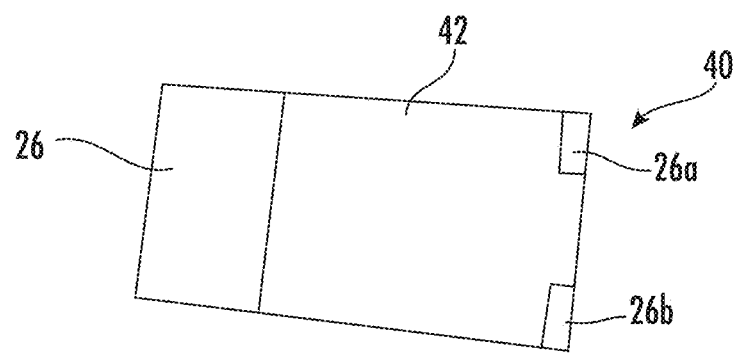
FIG. 6 is a plan view of a nanodiamond article showing its electrophoretically deposited nanodiamond film and a portion of the exposed substrate.
Figure 7:
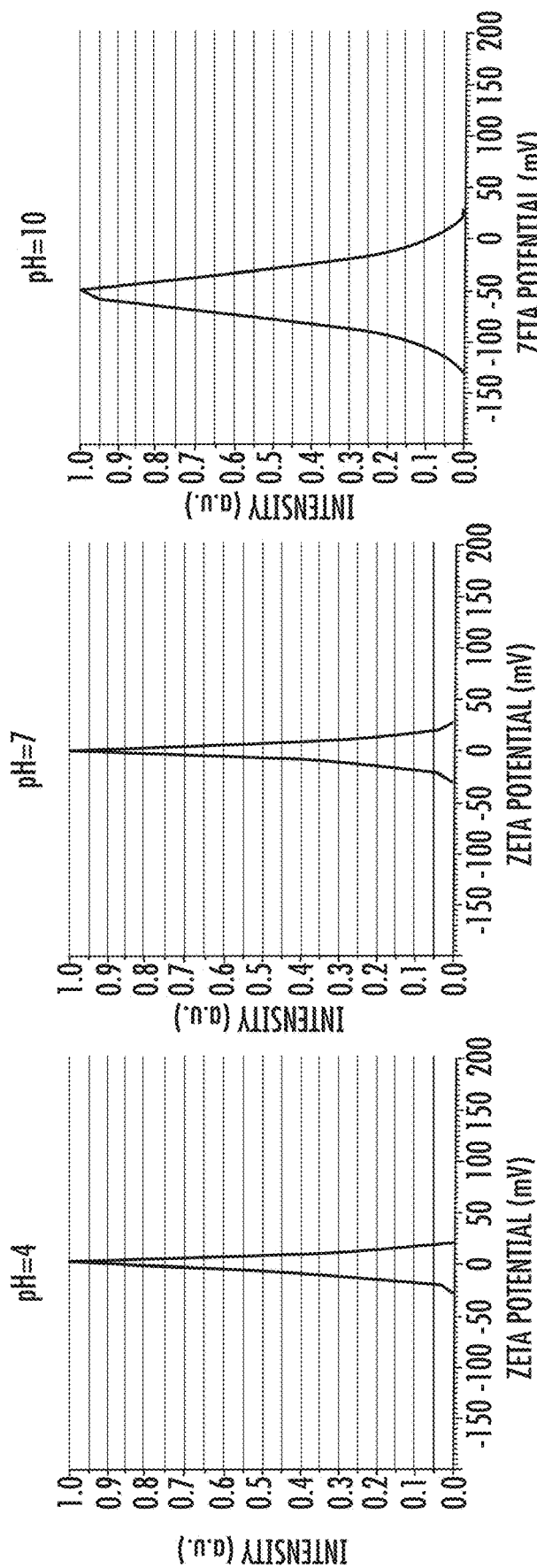
FIGS. 7A through 7C are graphs showing the zeta potential of nanodiamond particles at a respective pH of 4, 7 and 10 in an aqueous solution.

More specific details of the method for making the nanodiamond article 40 are now explained relative to FIGS. 5-13. Generally, the detonation nanodiamonds 24 are suspended in the preferred organic solution 32 and electrophoretically deposited into thick films as 2-2 morphology composites on the substrate 26 to form thermally conductive, and electrically anisotropic nanodiamond articles 40, such as the example shown in FIGS. 5 and 6. Reference is made to the nanodiamond article 40 in FIG. 5, showing that one or more optional, additional coating layers 66 may be deposited over the nanodiamond coating 42. The diagram of the sectional view in FIG. 6 shows the 2-2 morphology structure, where each phase of the nanodiamond coating 42 is dense and two dimensional. Due to the dielectric nature of the nanodiamond film 42, the nanodiamond article 40 is electrically and thermally conductive in two dimensions as shown by the arrows showing electrical and thermal conductivity and is electrically insulating but still thermally conductive in the third or vertical axis direction. Since the nanodiamond coating 42 is continuous and dense, this denser phase makes up a larger nanodiamond particle percentage than would be afforded by a 0-3 composite of a nanodiamond matrix structure. The example nanodiamond article 40 in FIG. 6 shows a partially coated copper substrate 26 and the nanodiamond coating 42 deposited thereon, and two exposed contacts 26a, 26b at the side edge.

In a specific process example, again referencing FIG. 1, detonation nanodiamonds, 0510 HZ as diamond nanoparticles/nanopowder (C, 95% and 3-4 nm), were obtained from SkySpring Nanomaterials, Inc. of Houston, Texas. These example nanodiamond particles 24 may not be terminated wholly by carbon atoms. Instead, their surface may include different functionalized groups, including large amounts of COOH (carboxyl) groups, which become de-protonated in basic solutions, giving them a negative zeta potential with O— ions at the nanodiamond surface, resulting in an electromotive force towards a positive electrode. When the pH of the solution 32 was adjusted to between 4 and 10, a positive zeta potential was not observed in the as received nanodiamonds 24 in aqueous solution. This is shown in the graphs of FIGS. 7A, 7B and 7C, showing the zeta potential of synthesized and purified nanodiamonds 24 at respective pH's of 4, 7, and 10 in the aqueous solution.

Although this negative zeta potential on the nanodiamonds 24 can assist in the initial suspension of the nanodiamonds, deposition problems may occur when these synthesized nanodiamonds are processed with anodic approaches. One potential issue with anodic deposition is that in this configuration, hydrolysis is promoted at the deposition electrode. Another potential issue is that, depending on the solubility of a metal layer in the electrophoretic deposition solution, the metal may be dissolved with the application of the electric field. Additionally, the synthesized nanodiamonds 24 have some amount of graphitic impurities as well, which are generally positively charged and will promote agglomeration when present in suspensions of negative zeta potential nanodiamonds.

To address these issues, the electrophoretic deposition process as described modifies the nanodiamond surface charge to promote positive surface charge using a reaction between iodine and a ketone or a similar molecule to form free protons 28 on the surface of the nanodiamonds 24 to facilitate cathodic deposition (FIG. 1). As noted before, it may be possible to use chemical reactions to modify the nanodiamond 24 surface. While this technique may work, it requires additional cost and time to achieve the desired outcome. Another detriment to other chemical surface modification may be stearic interactions, which are useful for maintaining the nanodiamonds 24 suspended in solution, but may decrease the density of any resultant nanodiamond coatings 42. Instead of functionalizing the nanodiamond surface, the nanodiamonds 24 are protonated as a result of the acetone/iodine reaction 28, in which the adsorbed protons occupy the stern layer around the negatively charged surface groups of the nanodiamond 24 creating a strong, positive zeta potential. This allows the nanodiamonds 24 to remain suspended even in the presence of any graphitic impurities and enables cathodic deposition.

As for the surface of the substrate 26 on which the nanodiamond coating 42 is to be deposited, an electric field should be provided between two electrodes, i.e., a counter electrode, and, in an example, a deposition electrode that includes a conductive surface, e.g., a copper substrate. However, different conductive substrates may be used, or even doped semiconducting substrates, composites, or even undoped semiconducting substrates or insulators near which an electric field can be applied. Varying surface treatments may be used to assist in the formation of the nanodiamond coating 42 on the substrate 26. In an example, the surface treatment of the substrate 26 may include physical preparation to change surface roughness or induce chemical modification of the substrate's surface using an acidic solution, a film-forming amine 36, and a surfactant 48 to improve the qualities of deposition.

Preferred surface characteristics for electrophoretic deposition were found to include a metallic copper surface for the substrate 26 that is free of oils, fingerprints, oxides, and tarnish, while simultaneously possessing the hydrophobic film-forming amine layer 36 that also operates as a passivation layer. In an example, this film-forming amine layer 36 is generated through the use of a commercially available one-step treatment solution known as Duraprep™, which includes the blend of acids, surfactants 48, and film-forming amines. An example of such blend is described in the incorporated by reference '170 patent. A uniform nanodiamond coating 42 is formed by the electrophoretic deposition of nanodiamonds 24 in the solution 32, which was first demonstrated in an example as a 1:1:1 deionized Water, Isopropyl Alcohol, and Acetone (DI:IPA:ACE) solvent that included 0.6 g/L nanodiamond and 0.8 g/L iodine.

The solvent used in the solution 32 during electrophoretic deposition may have N-methyl-2 pyrrolidone (NMP) substituted for the water. The solution 32 may contain 0.1 to 1.0 g/L of iodine and 0.1 to 5.0 g/L of nanodiamonds. It is also possible to treat the substrate surface using ion bombardment and other chemical micro-etching and other acid etching techniques. The film-forming amine 36 may also be a ligand layer with a hydrocarbon tail. The resulting nanodiamond coating 42 may have a thermal conductivity of about 385 to 3320 W/(m·K), and may be electrically non-conductive with a varying high dielectric strength, low dielectric constant, and low dielectric loss.

The selection of solvents depends on the selection of nanodiamond surface modification 28 and desired surface treatment. Although an iodine acetone reaction is the described method of forming a positive surface charge on the nanodiamonds 28, different reactions to generate protons may be used, including chlorine and bromine with acetone or acetylacetone as non-limiting examples. Additionally, positive surface charges may be achieved through surface functionalization of the nanodiamonds, such as annealing in a hydrogen or forming gas atmosphere. Once the surface is modified to produce a positive charge, there should be: (1) sufficient repulsive forces between nanodiamonds for suspension to be maintained, and (2) sufficient electromotive force resulting from the applied electric field. These are both in part a function of the permittivity of the suspension medium, and for that reason, the desired solvent should be to some extent polar, as decreasing polarity/permittivity may result in a higher required zeta potential and a larger required electric field, which may become difficult and costly to achieve using nonpolar solvents.

Figure 8:
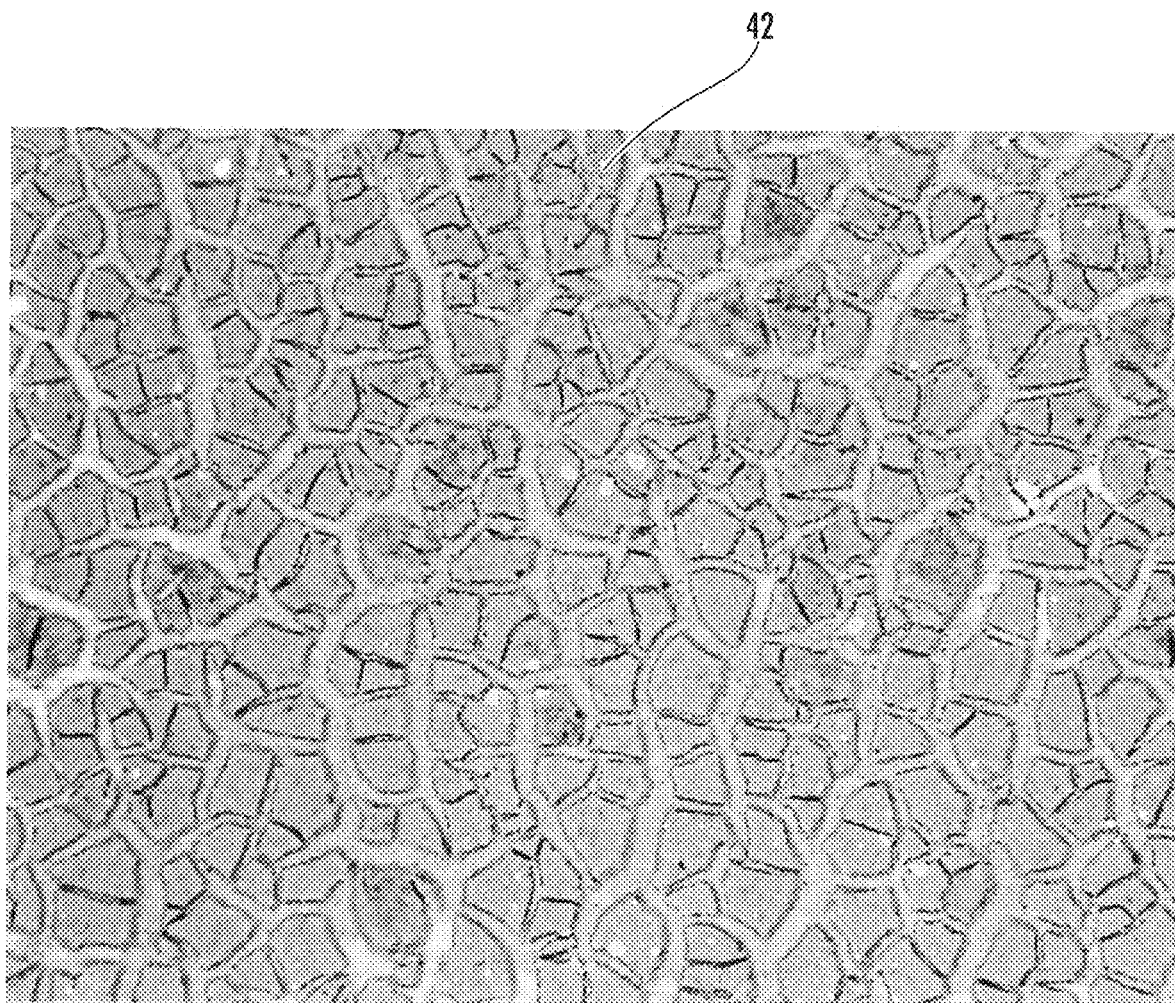
FIG. 8 is an enlarged plan view of the surface of the nanodiamond article and showing surface cracking when a 1:1:1 DI:IPA:ACE solution is used during electrophoretic deposition.
Figure 9:
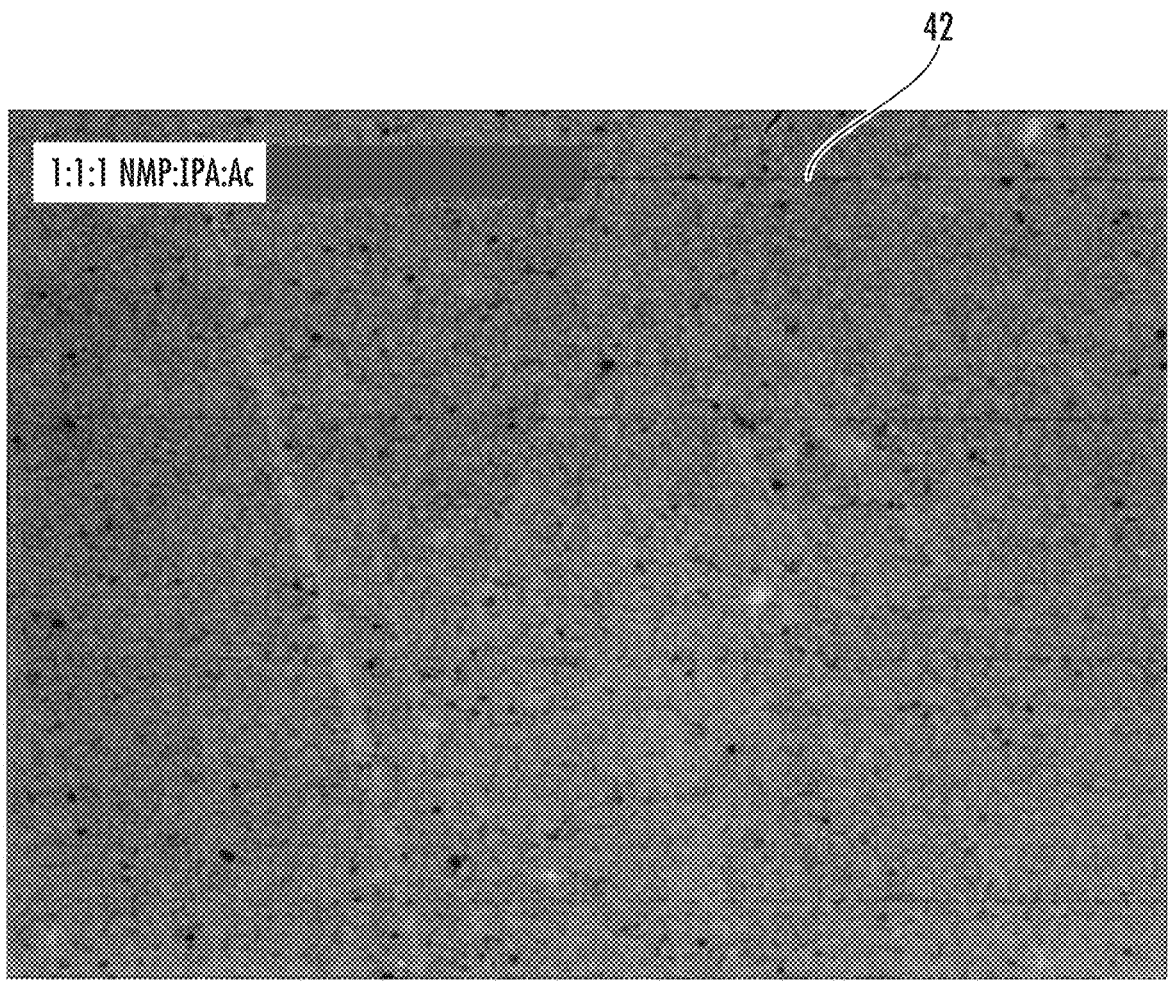
FIG. 9 is an enlarged plan view of the surface of the nanodiamond article and showing almost no cracking when a 1:1:1 NMP:IPA:ACE solution is used during electrophoretic deposition.
Figure 10:
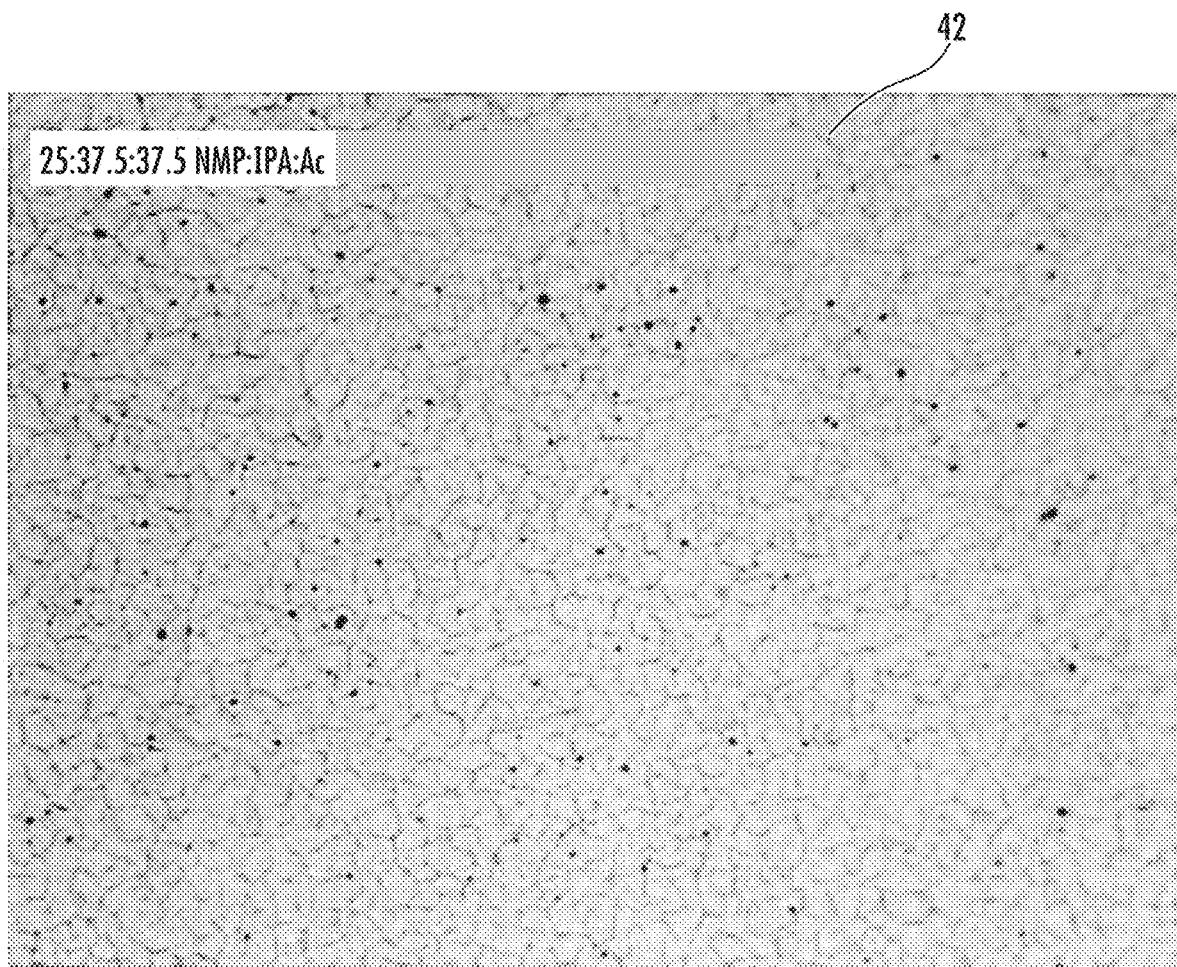
FIG. 10 is a plan view of the surface of the nanodiamond article showing minimal cracking when a 25:37.5:37.5 NMP:IPA:ACE solution is used during electrophoretic deposition.

A desired solvent also leads to minimal cracking upon drying due to capillary forces, which may be impacted by evaporation rate, wettability of the substrate 26 surface by the solvent, and surface tension of the solvent. The evaporation rate is also a factor in the economics of maintaining an electrophoretic deposition solution or bath. In a first test, acetone (ACE), isopropyl alcohol (IPA), and deionized water (DI) were used as the solvent mixture, but it was found that the lower surface tension solvents with greater wettability for the film-forming amine layer 36 performed better with regards to crack mitigation through reduction in capillary forces as compared to the cracking of the substrate 26 surface upon drying as shown in the example of FIG. 8, where the 1:1:1 deionized water, isopropyl alcohol, and acetone solution (DI:IPA:ACE) was used. The surface of the nanodiamond coating 42 shown in the enlarged plan view of FIG. 8 clearly shows the large amount of cracking.

Figure 11:
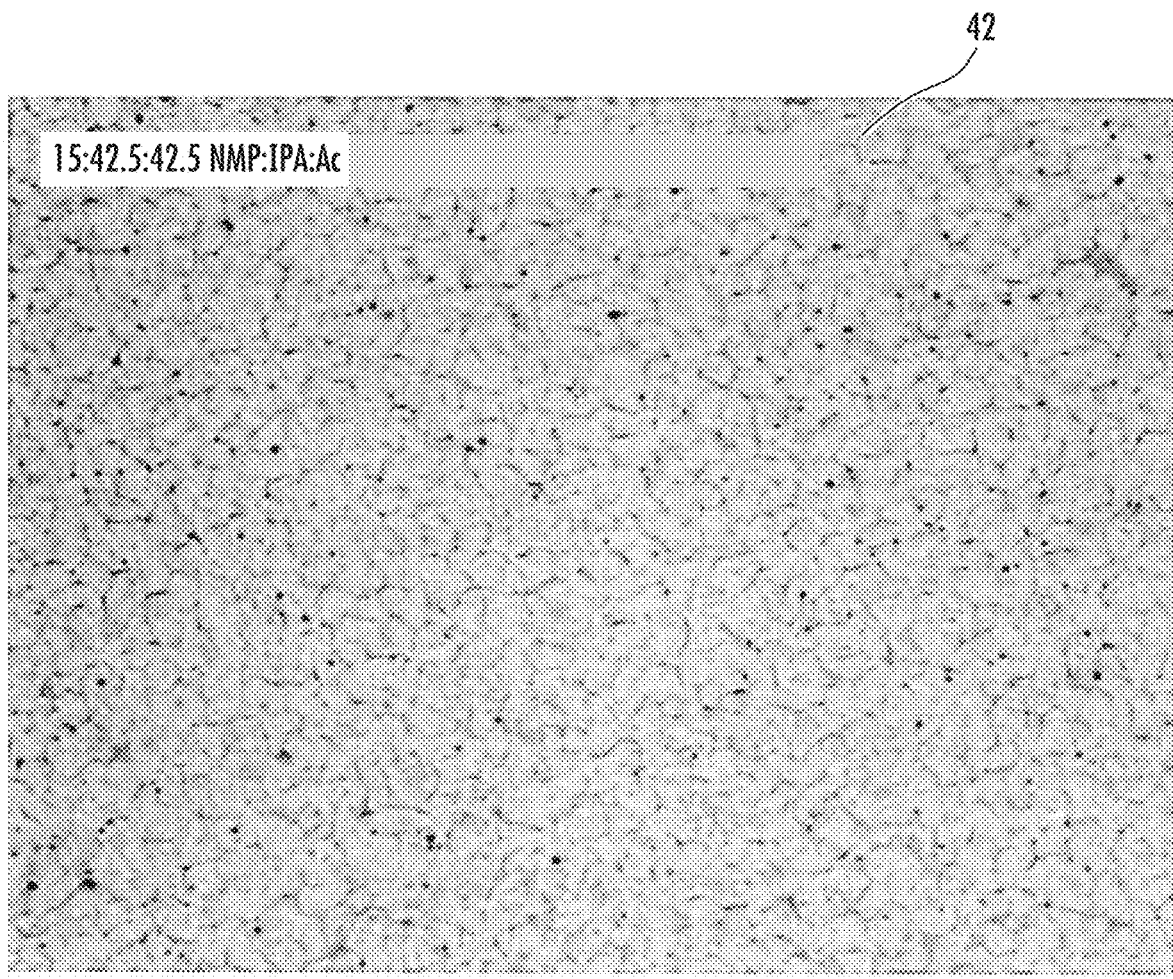
FIG. 11 is another plan view of the nanodiamond article and showing reduced amounts of cracking when a 15:42.5:42.5 NMP:IPA:ACE solution is used during electrophoretic deposition.

Other experiments were conducted with different solutions 32 and solvents and it was observed that surface cracking occurred less when lower surface tension solutions with higher wettability, manageable drying rates, and reasonable permittivities were used. Example solutions 32 that better controlled cracking included the NMP:IPA:ACE solvent solutions, with examples shown in FIGS. 9-11. The best results were achieved when a 1:1:1 NMP:IPA:ACE solution 32 was used (FIG. 9), and other desirable results were obtained with a 25:37.5:37.5 NMP:IPA:ACE solution (FIG. 10), and 15:42.5:42.5 NMP:IPA:ACE solution (FIG. 11). These solvent solutions 32 led to continuous nanodiamond coatings 42 with significantly decreased cracking and reasonable evaporation rates for economical bath use. Additional solutions 32 may be developed to reduce or eliminate cracking in the thick nanodiamond coatings 42.

Figure 12:
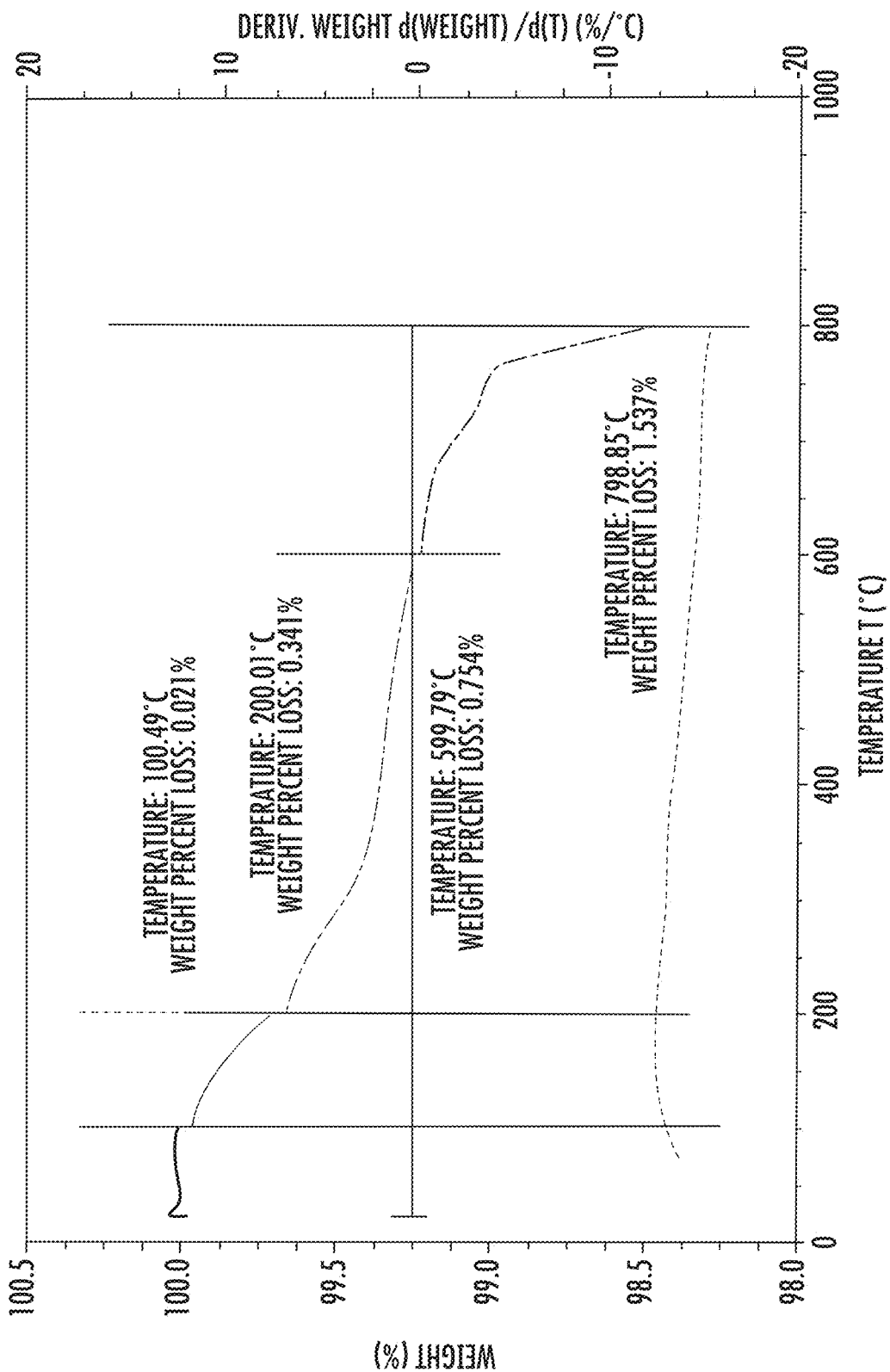
FIG. 12 is a graph of the thermogravimetric analysis (TGA) showing the reduction in weight of the nanodiamond film at different temperatures of annealing.

To improve mechanical integrity within the nanodiamond coating 42, thermal annealing was employed. Samples from the initial 1:1:1 NMP:IPA:ACE experimental runs were provided for Thermogravimetric Analysis (TGA) in a nitrogen atmosphere. There were successive reductions in weight at approximately 100, 200, 600, and 750° C. as shown in the graph of FIG. 12. Since graphitization occurs at approximately 1100-1400° C., none of these temperatures corresponded to graphitization of the nanodiamond coating 42. At up to 700° C., the weight loss corresponded to loss of oxygen groups instead of the predicted iodine loss as shown in the chart of FIG. 13. After a two hour anneal at 800° C., however, there was no iodine present in the annealed samples, with negligible change in the oxygen-to-carbon ratio. At post two hours of anneal at 800° C., the samples were qualitatively better adhered to the substrate 26 and darker in color. Further analysis may be accomplished using mass spectrometry.

The loss of the oxygen may cause bonds to break and the different annealing ranges may help densify and promote adhesion of the nanodiamond coating 42 onto the substrate 26. In one example, it was found that an annealing range from about 200° C. to 400° C. appeared to remove oxygen and densify the film. Iodine present in the film 28 was removed at high dwell times at higher temperatures, while oxygen removal at the lower temperatures help densify the nanodiamond coating 42 for better mechanical and thermal properties. At annealing temperatures greater than 200° C., but below 800° C., the oxygen had been removed and carbon-to-carbon bonds formed to improve nanodiamond coating 42 adhesion. The film-forming amine layer 36 existed between the substrate 26 and nanodiamond coating 42 and had not been heat decayed. Additional characteristics may be obtained using mass spectrometry in addition to the TGA analysis. In an example, the film-forming amine layer 36 is several nanometers.

Figure 14:
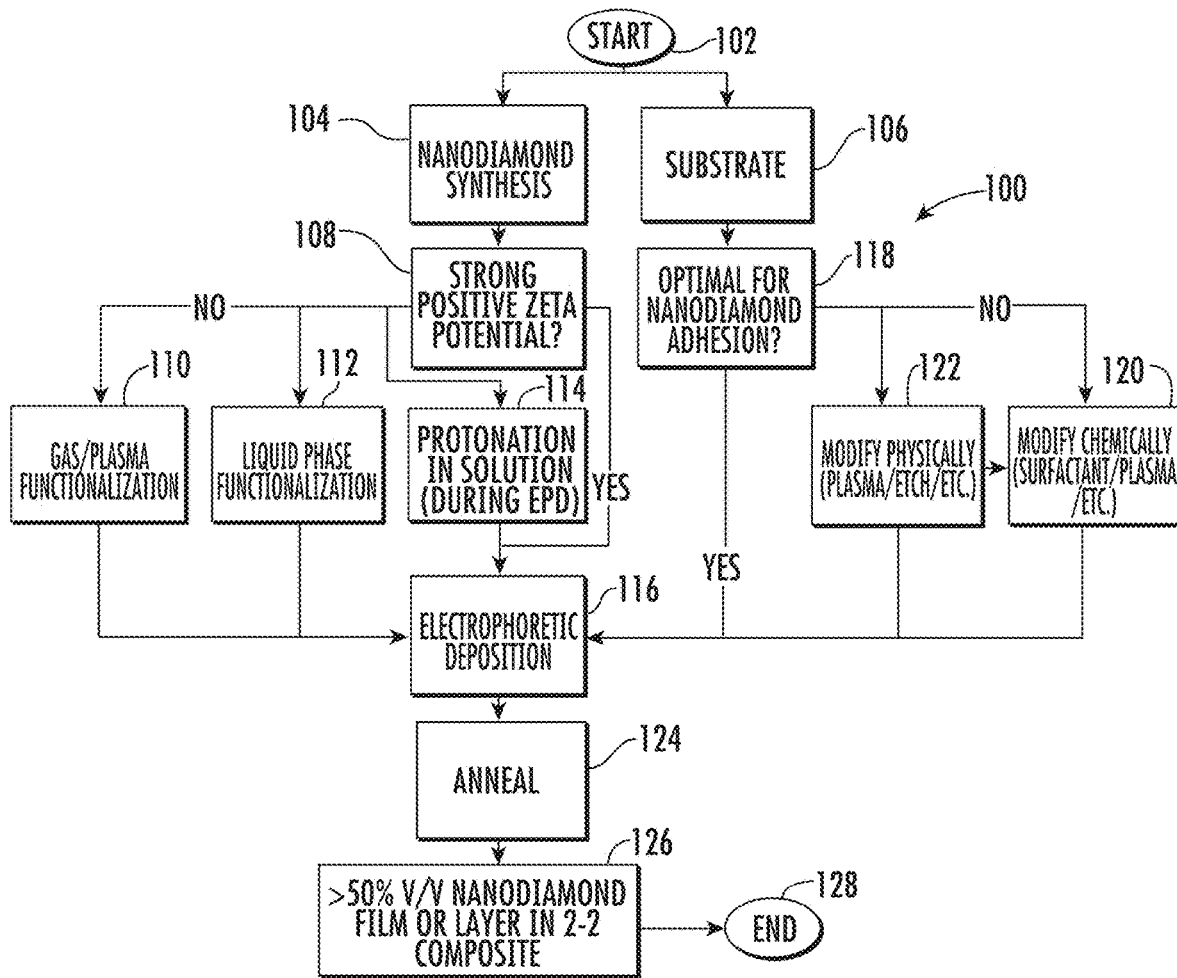
FIG. 14 is a flowchart showing steps in forming a nanodiamond article having a continuous film formed using electrophoretic deposition and having greater than 50% nanodiamond concentration by volume in a 2-2 composite.

Referring now to FIG. 14, there is illustrated at 100 a flowchart showing steps in forming a nanodiamond article 40 having a continuous film 42 that is formed using electrophoretic deposition and having greater than 50% nanodiamond concentration by volume in 2-2 composite. The process starts (Block 102) and the nanodiamonds 24 are provided and synthesized for electrophoretic deposition in later steps (Block 104). In a separate process sequence, the substrate 26 is provided to which the nanodiamonds are to be electrophoretically deposited (Block 106). Following the nanodiamond synthesis, a determination is made whether a strong positive zeta potential is on the nanodiamonds 24 (Block 108). If there is no strong zeta potential on the nanodiamonds 24, then the nanodiamonds are functionalized such as using gas/plasma functionalization (Block 110), liquid phase functionalization (Block 112), or protonation in a solution (Block 114). If the strong positive zeta potential does exist, then electrophoretic deposition may begin (Block 116), which may begin after functionalization and protonation (Blocks 110, 112 and 114). The substrate 26 in a separate processing sequence had been prepared as shown on the right-side flow sequence, where a determination is made whether the substrate is optimal for nanodiamond adhesion (Block 118). If it is not optimal for the adhesion of the nanodiamonds 24, the substrate 26 may be modified chemically such as through a surfactant, plasma, or similar chemical surface modification technique (Block 120) or modified physically such as via plasma, etching, or similar physical surface modification techniques (Block 122). After electrophoretic deposition (Block 116), the substrate 26 with the continuous film 42 applied is annealed (Block 124) forming the nanodiamond article having the greater than 50% nanodiamond concentration by volume as a film or layer in a 2-2 composite (Block 126). The process ends (Block 128).

This application is related to copending patent application entitled, "NANODIAMOND ARTICLE HAVING A HIGH CONCENTRATION NANODIAMOND FILM AND ASSOCIATED METHOD OF MAKING," which is filed on the same date and by the same assignee and inventors, the disclosure which is hereby incorporated by reference.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

The invention claimed is:

1. A nanodiamond article comprising:
   a substrate;
   a nanodiamond film comprising a plurality of electrophoretically deposited individual nanodiamond particles over the substrate; and
   an adhesion promoting layer between the substrate and the nanodiamond film, the adhesion promoting layer comprising a film-forming amine.

2. The nanodiamond article of claim 1 wherein the substrate comprises an electrical conductor.

3. The nanodiamond article of claim 2 wherein the electrical conductor comprises copper.

4. The nanodiamond article of claim 1 wherein said nanodiamond film has a thickness of greater than 30 microns.

5. The nanodiamond article of claim 1 wherein said nanodiamond film has a thickness of greater than 50 nm and less than 30 microns.

6. The nanodiamond article of claim 1 wherein said nanodiamond film defines a 2-2 composite film.

\* \* \* \* \*